I. MOSS.
SNAP FASTENER.
APPLICATION FILED MAY 8, 1917.
1,242,579.
Patented Oct. 9, 1917.
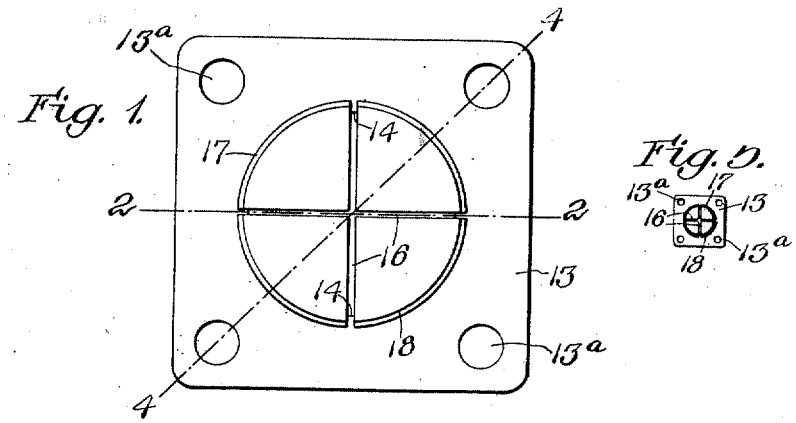
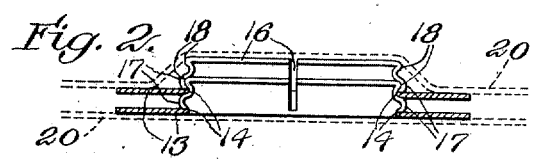
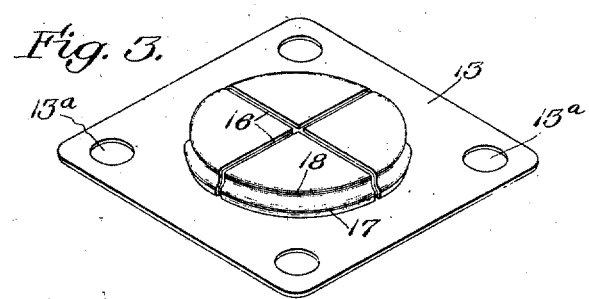
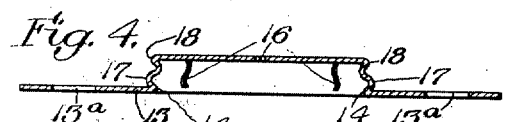
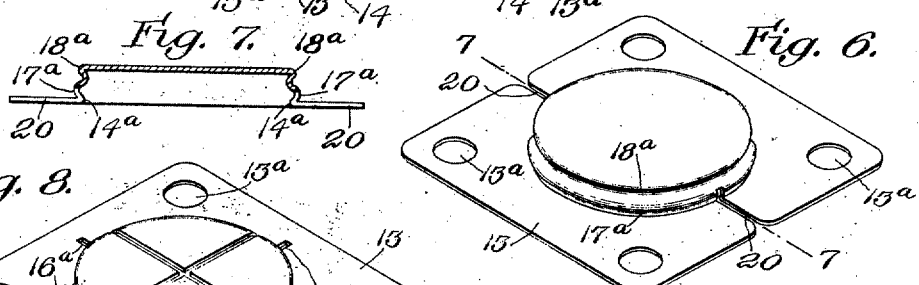
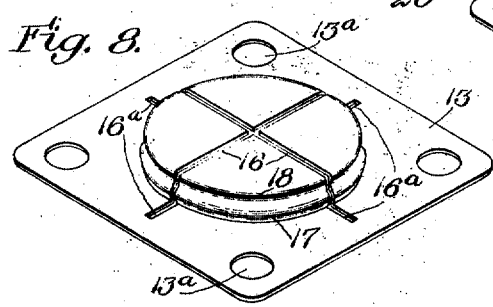
Inventor:
Isidor Moss,
by Wright Brown Quinby May
Attorneys.

UNITED STATES PATENT OFFICE.

ISIDOR MOSS, OF BROOKLINE, MASSACHUSETTS.

SNAP-FASTENER.

1,242,579.   Specification of Letters Patent.   Patented Oct. 9, 1917.

Application filed May 8, 1917. Serial No. 167,160.

*To all whom it may concern:*

Be it known that I, ISIDOR MOSS, a citizen of the United States, residing at Brookline, in the county of Norfolk and State of Massachusetts, have invented new and useful Improvements in Snap-Fasteners, of which the following is a specification.

This invention relates to snap fasteners usually of relatively small size, adapted for attachment by stitches, or other fastening means, to two parts of a glove, a skirt placket, or other article, the fastener being composed of two complemental members adapted to snap into separable engagement with each other, and thereby separately connect said parts.

The invention has for its object to provide a simple, conveniently operated and effective snap fastener, the members of which are duplicates each of the other, so that each member may be manufactured by the same instrumentalities used in manufacturing the other member, thus reducing to the minimum the cost of the necessary appurtenances employed in manufacturing the members, and also reducing to the minimum, loss and inconvenience in case one member becomes inoperative by breakage, or otherwise, the other member remaining operative.

The invention is embodied in the improvements which I will now proceed to describe and claim.

Of the accompanying drawings forming a part of this specification,—

Figure 1 is a plan view of a snap fastener embodying the invention.

Fig. 2 is a section on line 2—2 of Fig. 1, showing both members.

Fig. 3 is a perspective view representing either of the members shown by Figs. 1 and 2.

Fig. 4 is a section on line 4—4 of Fig. 1.

Fig. 5 is a plan view, showing approximately the preferred size of each member.

Fig. 6 is a perspective view of a modification.

Fig. 7 is a section on line 7—7 of Fig. 6.

Fig. 8 is a perspective view of another modification.

The same reference characters indicate the same parts in all of the figures.

Each duplicate member in the embodiment of invention shown by Figs. 1 to 4, includes a flat inexpansible base portion 13, adapted to engage means, such as stitches, securing the member to a carrying part, the base portion being provided with stitch-receiving orifices 13$^a$.

Each member also includes internal and external engaging means integral with the base, the external engaging means of each member being complemental to the internal engaging members of the other member and adapted to snap into engagement therewith.

While the invention may be embodied in various forms, I prefer the form illustrated by Figs. 1 to 5, this being well adapted for placket fasteners of substantially the size shown by Fig. 5.

The base 13 has a central opening and forms an inexpansible frame surrounding the opening. The wall of said opening forms an internal shoulder 14 which is inexpansible and constitutes the preferred embodiment of the above-mentioned internal engaging means. The base forms the marginal portion of an originally flat blank, the central portion of which is offset from the base and forms a hollow boss. The continuity of the said boss is interrupted by slots 16 extending across the wall and across the head portion of the boss, the wall being thus subdivided into a plurality of resilient flanges 17 integral with the base. The outer edge of each flange is provided with an external shoulder 18, the series of shoulders 18 constituting the preferred embodiment of the above-mentioned external engaging means. Said external shoulders, which are yieldingly supported by the flanges 17, are adapted to snap into engagement with the continuous unyielding internal shoulder 14, when the two members are assembled or nested, as shown by Fig. 2, the members being thus interengaged with sufficient tenacity for all practical purposes. The base portions of the interengaged members are spaced from each other, so that the members may be readily separated by inserting a finger nail between the base portions. The spacing of the base portions prevents either base portion from chafing stitches engaged with the other base portion. The members may also be separated by a pull exerted on one or both of the carrying parts 20 secured to the members. As shown by Fig. 2, one of said carrying parts bears on the embossed side of one member and on the opposite side of the other member. The internal shoulder 14 is preferably circular and the external shoulders 18 are preferably segments of a circle, while the margin of the base 13 is preferably rectangular. This form of the base margin is preferred, because it enables the base to be confined with its orifices 13ª in predetermined positions with reference to the needle of a sewing machine employed to sew the member to a carrying part, the machine being provided with suitable positioning means engaging opposite edges of the base and preventing the member from turning.

The segmental tongues into which the head portion of the boss is converted by the slots 16, prevent undesirable flexibility of the flanges 17, and assist in maintaining a sufficiently firm engagement between the external shoulders 18 and the internal shoulder 14.

The base having its margin formed to prevent the member from turning may be employed in a fastening member having any suitable engaging means complemental to engaging means on another member.

In the above-described embodiment of the invention the outer shoulders 18 constitute units or sections of an expansible annular shoulder, the inner annular shoulder 14 being inexpansible. It is essential that one of said annular shoulders be resilient or capable of being contracted and of expanding after contraction, and that the other shoulder be inexpansible or rigid and adapted to cause contraction of the resilient shoulder during the operation of connecting the member and to limit the expansion of the resilient shoulder when the members are operatively connected.

In the modification shown by Figs. 6 and 7, the inner shoulder is resilient or adapted to be expanded and to contract after expansion, and the outer shoulder is inexpansible or rigid. The base is provided with disconnected slots 20, extending from its margin through the inner shoulder, here designated by 14ª, the inner ends of said slots being in the annular wall of the boss. The continuity of the shoulder 14ª is therefore interrupted, so that said shoulder is composed of units or sections which are adapted to be sprung apart to expand the shoulder and to automatically contract.

The major portion of the annular wall 17ª of the boss and the entire head thereof are continuous and inexpansible, and constitute a connection between the divisions or units of the base and of the inner shoulder, the outer shoulder, here designated by 18ª, being also continuous and inexpansible.

Fig. 8 shows another modification having a resilient inner shoulder and a resilient outer shoulder, the construction being the same as that shown by Figs. 1, 2, 3 and 4, excepting that the slots 16 are extended at 16ª into the base, but not through its margin, the inner shoulder being therefore resilient.

Each of the described embodiments of the invention comprises two duplicate or associable components or members, each including a base portion provided with means whereby it may be attached to a support or carrying part, a receiving portion, and an entering portion. The entering portion of each member is complemental to the receiving portion of the other member, and said portions are constructed to separably interlock, or have a separable interlocking engagement with each other. This adaptation for separable interlocking may be caused by making one portion resilient and the other portion non-resilient, or of less resilience, it being obvious that either the entering portion or the receiving portion may be resilient. In Figs. 1 to 5, both inclusive, and Fig. 8, the portions 17 are resilient and the portions 14 are of less resilience; and in Figs. 6 and 7, the portions 17ª are the resilient parts and the portions 14ª are of less resilience.

I claim:

1. A snap fastener composed of two duplicate members, each including a base adapted to engage securing surface, and internal and external engaging surface integral with the base, the external engaging surface of each member being complemental to and adapted to snap into engagement with the internal engaging surface of the other member.

2. A snap fastener composed of two duplicate members, each including an inexpansible centrally open base adapted to engage securing means, the wall of the base opening constituting an inexpansible internal shoulder; and a plurality of independent resilient flanges integral with the base and having external shoulders offset from the base, the external shoulder of each member being complemental to and adapted to snap into engagement with the internal shoulder of the other member.

3. A snap fastener composed of two duplicate members, each including a flat inexpansible marginal base adapted to engage securing means, the wall of said base having a depression which constitutes an internal shoulder, and a slotted boss surrounded by and offset from said base, the wall of said boss forming independent resilient flanges and being provided with external shoulders adapted to snap into engagement with the internal shoulder of the other member.

4. A snap fastener composed of two duplicate members, each including a base adapted to engage securing means, and having an opening forming an inner internal shoulder; and a boss surrounded by and offset from the base and provided with an outer external shoulder, one of said shoulders being resilient and the other inexpansible, and one shoulder being shaped to snap into locking engagement with the other.

5. A snap fastener comprising duplicate components securable together by forcing one component upon the other in a line transverse to the plane of the components.

6. A snap fastener comprising associable components each including a receiving portion and an entering portion, one of said portions being complemental to the other portion, said components being securable together by pressing either component upon the other in a line transverse to the plane of the components.

7. A snap fastener comprising associable components each including a receiving portion and an entering portion, one of said portions being complemental to the other portion, said components being securable together by pressing either component upon the other in a line transverse to the plane of the components, one portion of said components being resilient, and another portion being of less resilience.

8. A snap fastener comprising associable components, each comprising a receiving portion and an entering portion, the receiving portion being complemetal to the entering portion, and one of said portions being resilient and the other being of less resilience, said components being securable together by pressing either component upon the other in a line transverse to the plane of the components.

9. A snap fastener comprising two duplicate members each including a base having means whereby it may be attached to a support, a receiving portion and an entering portion, one of said portions being resilient and the other portion of less resilience, the entering portion of each member being complemental to the receiving portion of the other member.

In testimony whereof I have affixed my signature.

ISIDOR MOSS.

Correction in Letters Patent No. 1,242,579.

It is hereby certified that in Letters Patent No. 1,242,579, granted October 9, 1917, upon the application of Isidor Moss, of Brookline, Massachusetts, for an improvement in "Snap-Fasteners," an error appears in the printed specification requiring correction as follows: Page 2, line 96, claim 1, for the word "surface" read *means;* and that the said Letters Patent should be read with this correction therein that the same may conform to the record of the case in the Patent Office.

Signed and sealed this 20th day of November, A. D., 1917.

[SEAL.]

R. F. WHITEHEAD,

*Acting Commissioner of Patents.*

Cl. 24—208.